US008299404B2

(12) United States Patent
Van Der Weij

(10) Patent No.: US 8,299,404 B2
(45) Date of Patent: Oct. 30, 2012

(54) APPARATUS FOR PREPARING FOOD AND AIR GUIDE MEMBER THEREFOR

(75) Inventor: Fedde Van Der Weij, Almere (NL)

(73) Assignee: Kavaring Cooking Systems B.V., Almere (NL)

( * ) Notice: Subject to any disclaimer, the term of this patent is extended or adjusted under 35 U.S.C. 154(b) by 695 days.

(21) Appl. No.: 12/335,012

(22) Filed: Dec. 15, 2008

(65) Prior Publication Data

US 2009/0134140 A1    May 28, 2009

Related U.S. Application Data

(63) Continuation-in-part of application No. PCT/EP2007/055993, filed on Jun. 18, 2007.

(30) Foreign Application Priority Data

Jun. 16, 2006   (EP) ..................................... 06115609

(51) Int. Cl.
*A21B 1/26*    (2006.01)
*A21B 3/00*    (2006.01)
*A21B 3/07*    (2006.01)

(52) U.S. Cl. .......................... 219/400; 126/21 A; 99/476
(58) Field of Classification Search ........................ None
See application file for complete search history.

(56) References Cited

U.S. PATENT DOCUMENTS

| | | | | |
|---|---|---|---|---|
| 2,966,573 A * | 12/1960 | Hansen | .......................... | 219/400 |
| 3,586,516 A * | 6/1971 | Terc | .............................. | 219/400 |
| 3,783,832 A * | 1/1974 | Marsh | ........................... | 119/319 |
| 3,820,525 A * | 6/1974 | Pond | ............................ | 126/21 A |
| 3,821,454 A * | 6/1974 | Lobel | ........................... | 426/524 |
| 3,825,723 A * | 7/1974 | Roeser | ......................... | 219/401 |
| 3,828,760 A * | 8/1974 | Farber et al. | ................ | 126/21 A |
| 4,010,341 A * | 3/1977 | Ishammar | ..................... | 219/400 |
| 4,374,318 A * | 2/1983 | Gilliom | ........................ | 219/400 |
| 4,374,319 A | 2/1983 | Guibert | | |
| 4,426,923 A | 1/1984 | Ohata | | |
| 4,484,064 A * | 11/1984 | Murray | ......................... | 219/400 |

(Continued)

FOREIGN PATENT DOCUMENTS

EP    0279065    12/1987

(Continued)

OTHER PUBLICATIONS

Official Search Report of the European Patent Office in counterpart foreign application No. PCT/EP2007/055993 filed Jun. 18, 2007.
Written Opinion of the European Patent Office in counterpart foreign application No. PCT/EP2007/055993 filed Jun. 18, 2007.

*Primary Examiner* — Joseph M Pelham
(74) *Attorney, Agent, or Firm* — Steven M. Koehler; Westman, Champlin & Kelly P.A.

(57) ABSTRACT

Apparatus for preparing food, comprising a food preparation chamber with an air-permeable bottom wall and an upper air discharge opening, a fan for moving hot air successively through the bottom wall, the food preparation chamber and the discharge opening, an air guide for returning the air from the discharge opening towards the bottom wall separate from the food preparation chamber, a heat radiating element positioned in the upper part of the food preparation chamber and an air guide member below the food preparation chamber. The air guide member is provided for directing the air flow essentially upwards into food present in the food preparation chamber.

34 Claims, 4 Drawing Sheets

U.S. PATENT DOCUMENTS

| | | | |
|---|---|---|---|
| 4,494,683 A * | 1/1985 | Kleber | 223/51 |
| 4,591,698 A * | 5/1986 | Chang | 219/400 |
| 4,771,162 A * | 9/1988 | Schatz et al. | 219/400 |
| 5,466,912 A * | 11/1995 | Dornbush et al. | 219/400 |
| 5,485,780 A * | 1/1996 | Koether et al. | 99/419 |
| 5,513,558 A * | 5/1996 | Erickson et al. | 99/330 |
| 5,676,870 A | 10/1997 | Wassman et al. | |
| 6,198,076 B1 * | 3/2001 | Moen et al. | 219/400 |
| RE37,238 E * | 6/2001 | Song | 99/469 |
| 2007/0125354 A1 | 6/2007 | Boesch | |

FOREIGN PATENT DOCUMENTS

| | | |
|---|---|---|
| EP | 0284420 A1 | 9/1988 |
| EP | 0489954 | 12/1990 |
| FR | 2406984 | 5/1979 |
| GB | 1319855 | 6/1973 |
| WO | WO 2005/048796 | 6/2005 |

* cited by examiner

A          B

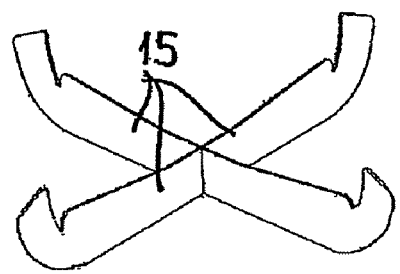
A
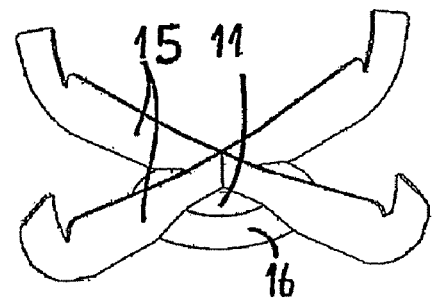
B
Fig. 3
Fig. 4
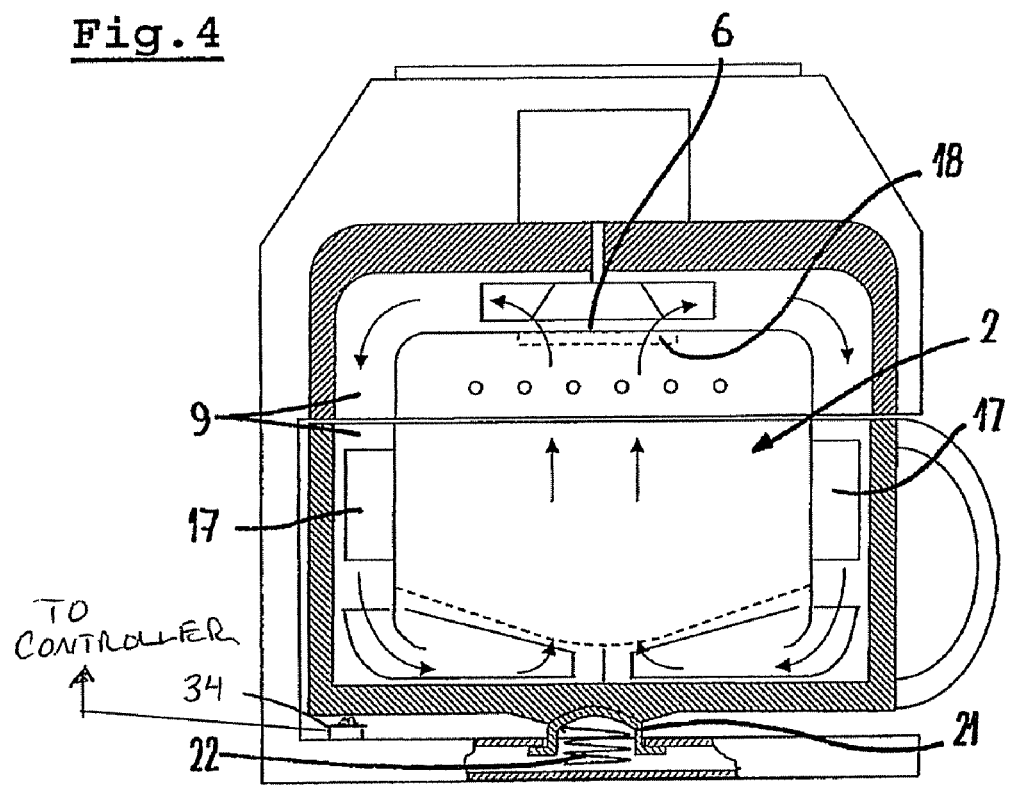

APPARATUS FOR PREPARING FOOD AND AIR GUIDE MEMBER THEREFOR

CROSS-REFERENCE TO RELATED APPLICATION

The present application is a continuation-in-part of and claims priority under 35 USC §120 of International patent application Ser. No. PCT/EP2007/055993, filed Jun. 18, 2007, and published as WO 2007/144432 in English, the content of which is hereby incorporated by reference in its entirety.

BACKGROUND

The discussion below is merely provided for general background information and is not intended to be used as an aid in determining the scope of the claimed subject matter.

An aspect of the invention firstly relates to an apparatus for preparing food, comprising a food preparation chamber with an air-permeable bottom wall and an upper air discharge opening, a fan for moving hot air successively through the bottom wall, the food preparation chamber and the discharge opening, an air guide for returning the air from the discharge opening towards the bottom wall separate from the food preparation chamber, a heat radiating element positioned in the upper part of the food preparation chamber and an air guide member below the food preparation chamber.

Such an apparatus is known, for example, from U.S. Pat. No. 4,374,319 and from EP-A-284.420. In the known apparatus according to the former document the food preparation chamber is provided with a sliding shelf defining the bottom wall thereof. This sliding shelf is provided with an array of small perforations to admit hot air from a bottom air space (acting as air guide member) into the food preparation chamber. The hot air flows through the food preparation chamber as high velocity air streams. In the latter document FIG. 7 shows a space defined by a convex air guiding wall in parallel to and underneath the air-permeable bottom wall. The air is allowed to swirl in this space and is not directed upwards.

An apparatus of this type provides a method for the preparation of food wherein the food is heated from below (by means of the air flow) and from above (by the heat radiating element) simultaneously. The air, which is heated by the heat radiating element, circulates within the apparatus and prepares the food (frying, cooking).

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In accordance with an aspect of the present invention the air guide member is provided for directing the air flow essentially upwards into food present in the food preparation chamber.

In this aspect the phrase 'essentially upwards' basically tries to express that the radial component of the flow is bent essentially vertically upwards such that the flow essentially occurs upwards through the food. Such an upwardly directed air flow leads to an improved regular air flow pattern, compared to a situation in which the air would arrive at the bottom wall of the food preparation chamber with a considerable radially directed flow component (as will be the case, for example, in the apparatus according to the state of the art mentioned above). As a result the food is prepared evenly.

Preferably the air guide member provides an unobstructed air flow pattern having the highest velocity in the center of the food preparation chamber and decreasing radially outward.

In this context 'unobstructed' means a situation in which no food is present in the food preparation chamber. However, the distribution of the air flow across the food preparation chamber will be influenced by the food. Generally the food will be positioned such that it provides the highest flow resistance in the center, decreasing radially outwards. In combination the velocity distribution and the resistance distribution will provide the desired regular flow pattern across the food preparation chamber (thus, for example, the 'obstructed' air flow velocity will be substantially constant across the entire food preparation chamber).

Preferably said air guide member comprises air guide ribs.

For example it is possible that said air guide ribs are arranged in vertical planes, extend radially and meet at a central location. Such ribs promote the upward air flow, prevent a circular (swirling) air flow and create a pressure increase towards the centre.

Preferably, the air guide member comprises a frusto-conical upwardly tapering air guide part. Such air guide part is very effective in promoting the upward air flow. This part also may be combined with the above air guide ribs and be positioned concentrically therebelow.

Constructively it is preferred that there are three or more air guide ribs substantially arranged as a cross with arms of equal length. Then, when there are four air guide ribs, these substantially are arranged in the shape of a Greek cross.

Although then, basically, the ribs would be straight, it is conceivable too that the individual air guide ribs have a curved extension, of which preferably the direction of curve is determined by the rotation direction of the fan such that the air converges in the center.

When, in accordance with another embodiment, the air guide ribs and, if provided, the air guide part define an assembly which is removable from the remainder of the apparatus, one can remove said air guide ribs for inspection, maintenance, cleaning or for interchanging it (depending on the specific use of the apparatus, e.g. the specific food to be prepared).

When, in accordance with another preferred embodiment of the apparatus according to the present invention, the bottom wall of the food preparation chamber has, at least partly, an open structure, the air can flow easily through the bottom wall and can reach all sides of the food and can heat it very effectively. In this respect it should be noted that the state of the art shelf does not have an open structure, because the penetrations only define a very small part of the entire area of the shelf. Here, however, an open structure means that a substantial part of the area is open for the passage of the air flow.

Such an open structure can, for example, be achieved when the bottom wall of the food preparation chamber is, at least partly, defined by a grid or mesh structure. Then the openings even define the greater part of the area.

Preferably the food preparation chamber is constructed in a manner as to provide a disposition of the food therein having a cross-sectional area increasing upwardly.

As a result the highest flow resistance can be obtained in the center of the food preparation chamber, which measure, as stated above, may have an advantageous effect on the operation of the apparatus.

Preferably at least the bottom wall of the food preparation chamber is corrugated. This may lead to a positioning of the food in the valleys of the corrugations, whereas the tops are free for the passage of the air, which disposition is advantageous in case of dense food which is not very permeable for air.

Further it is preferred that the food preparation chamber has a circumferential wall with a lower end extending downwardly beyond the connection between said circumferential wall and the bottom wall of the food preparation chamber. Such lower end, which may be curved (for example inwardly), is helpful in directing the flow of air into the food and prevents a return of the air into the air guide.

When the food preparation chamber is provided with a removable bottom wall, it can be replaced by another bottom wall or even other type of bottom wall more suited for the type of food to be prepared, if needed.

In yet another preferred embodiment of the apparatus according to an aspect of the present invention, the food preparation chamber is double-walled with an inner wall and an outer wall defining therebetween the air guide for returning the air from the discharge opening towards the bottom wall and wherein said double-walled food preparation chamber is housed within an outer shell.

In such an embodiment the heated air circulating within the apparatus does not come into contact with the outer shell which remains at a low, safe temperature.

It is possible that the air guide for returning the air from the discharge opening towards the bottom wall comprise a number of distinct channels.

An extremely user friendly apparatus can be obtained when the food preparation chamber comprises an upper portion and a removable lower portion. The lower portion generally will contain the food to be prepared, and after removing it a user can shake it to disturb the food before again reinstalling the lower portion. This offers a user the possibility to at a certain level control the food preparation process in accordance with its own wishes. The user does not have to reach within the food preparation chamber and therefore stays safely away from the circulating heated air and from the heat radiating element.

For example it is possible that the lower part of the food preparation chamber comprises a grip and a basket-like member within the double wall. The grip makes the handling of the lower part easy, whereas the basket-like member provides a good flow pattern for the air flow.

Such a basket-like member can have an inverted frustoconical shape, which will lead to a corresponding disposition of the food with favorite flow characteristics therethrough.

It may be advantageous if a mechanism is provided for deactivating the heat radiating element and/or stopping the air flow between the inner and outer walls when the upper and lower portion of the food preparation chamber are separated. As a result no dangerous situations can occur when a user for example removes the lower part without deactivating the apparatus.

For example such a mechanism may comprise a switch cooperating with the removable portion of the food preparation chamber. When the lower portion is removed the switch is operated. However, other positions of such a switch are conceivable too.

Constructively there are many options for further realising the apparatus. For example the basket-like member may be removable wherein the grip comprises an activatable latch for connecting and disconnecting the removable basket-like member.

For obtaining a good connection and sealing between the upper and lower portion of the food preparation chamber it is possible that a mechanism is provided for pre-loading the lower portion towards the upper portion of the food preparation chamber.

Such a mechanism may comprise a spring located underneath the lower portion.

Because during preparation of food within the basically closed system within the apparatus a pressure rise will occur, the food preparation chamber preferably is provided with a pressure relief valve, or openings to release pressure and steam. These openings can be provided with a filter to reduce fumes and exhaust of fat particles.

It is possible that both the upper portion and lower portion are provided with a grip.

For example, when the lower and upper portion are assembled, the grips together define a unitary combined grip, for example by being nested or by being arranged closely alongside each other.

When in the air guide for returning the air from the discharge opening towards the bottom wall vertically extending air guides are provided, a circumferential, swirling air flow in said air guide may be prevented.

It is favourable too that at the start of the air guide for returning the air from the discharge opening towards the bottom wall, above the food preparation chamber, radially extending air guides are provided. This also encourages a proper air flow in said air guide.

Preferably, in such a case, said radially extending air guides are part of a heat reflector defining the top of the food preparation chamber.

Such a heat reflector may be removable.

The invention secondly relates to an air guide member presenting all the features of the air guide member provided in the apparatus in accordance with the present invention.

BRIEF DESCRIPTION OF THE DRAWINGS

Hereinafter the invention will be elucidated while referring to the drawings in which:

FIG. 3 perspectively shows two different configurations of air guide ribs;

FIG. 4 shows another embodiment of the apparatus according to the invention in a schematical vertical cross-sectional view;

DETAILED DESCRIPTION OF THE ILLUSTRATIVE EMBODIMENT

Figure 1:
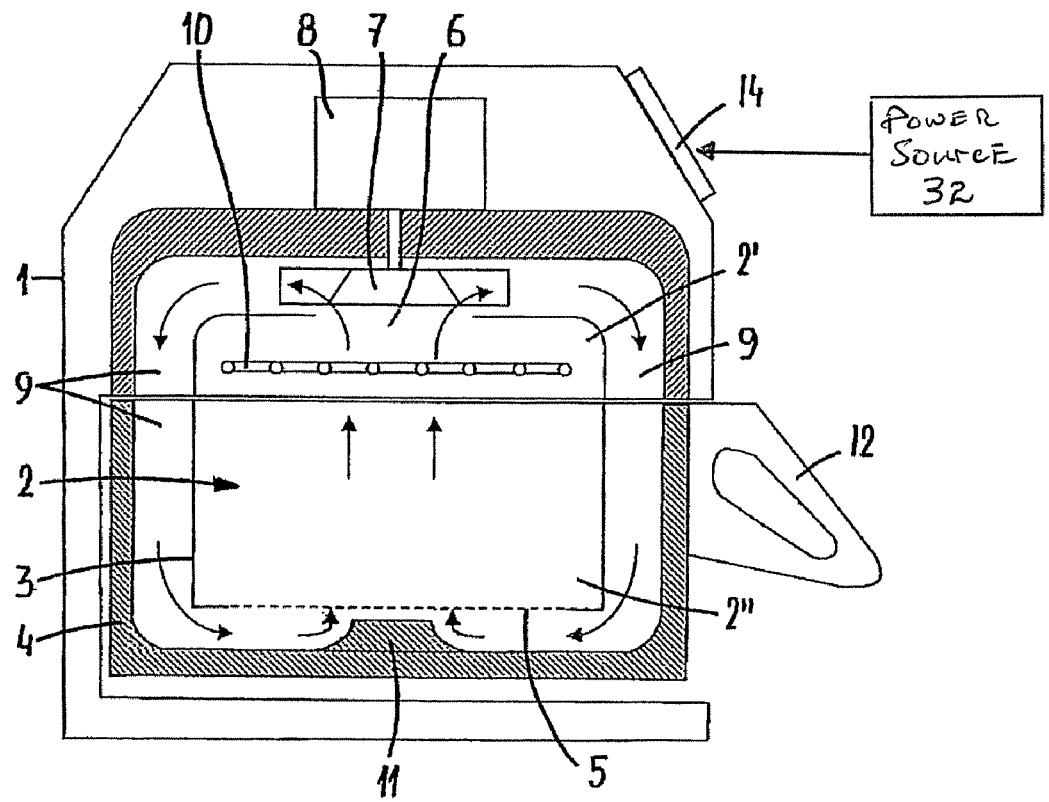
FIG. 1 shows an embodiment of the apparatus according to the invention in a schematical vertical cross-sectional view.

Referring to FIG. 1 the apparatus comprises an outer shell 1 which may be fabricated of a plastic material. Within said shell 1 a double-walled food preparation chamber 2 is defined surrounded by an inner wall 3 and an outer wall 4. In its bottom part the inner wall 3 is provided with an air-permeable bottom section 5. At its top, the inner wall is provided with a discharge opening 6 for air.

Above the discharge opening 6 a fan 7 is positioned which is driven by an electric motor 8 (of which the speed may be controllable). By means of the low pressure caused at one side of said fan 7 air is sucked from the food preparation chamber 2 through the discharge opening 6, and is delivered at a high pressure in a channel 9 defined between the inner wall 3 and outer wall 4. Thus the air is forced through said channel 9 towards and through the air-permeable bottom section 5 of the inner wall 3 to arrive again at the food preparation chamber 2.

It is noted that, although FIG. 1 suggests that the channel 9 between the inner wall 3 and outer wall 4 continuously surrounds the food preparation chamber 2 to define an annular channel, it also conceivable that there are a number of distinct channels leading from the fan 7 towards the bottom section 5.

In the upper part of the food preparation chamber one (or a number of) heat radiating elements 10 is positioned which not only radiates heat into the food preparation chamber and towards any food present therein, but also heats the air circulating in the apparatus and flowing upwardly past said heat radiating means 10. The heat radiating element(s) 10 can take a number of forms, but commonly, is/are elongated, electric (resistive) heat radiating element(s), the voltage and/or current supplied thereto from a power source 32 being controlled by a controller herein represented by control panel 14. It should be noted the manner in which the heat radiating element 10 obtains heat for radiating is not important in that the source of power (heat) can be obtained from electricity, natural gas or oil to name a few and the heat radiating element can be solid or hollow (for example filled with a heat transmitting fluid such as steam).

Thus, food in the food preparation chamber 2 is heated simultaneously in two different manners: by heat radiated from the heat radiating elements 10 and by the heated air passing the food from below.

Below the bottom section 5 sitting on the outer wall 4 is air guide member 11. The arrangement and/or shape of this air guide member 11 is such that the arriving air is directed upwardly through the bottom section 5 and into the food preparation chamber 2 with a regular flow pattern. This means that the air guide member 11 causes an essentially upwardly directed air flow along the food present in the food preparation chamber 2. As a result across the entire cross-section of the food preparation chamber 2 the interaction between the heated air and the food is substantially equal. Another possibility is that the air guide member sitting on the outer wall 4 provides an unobstructed air flow pattern (that means without the presence of food) having the highest velocity in the central location of the food preparation chamber 2 and decreasing radially outward. Then, when food is present the resulting air flow can have the required regular pattern.

As shown schematically in FIG. 1, the bottom section 5 of the inner wall 3 of the food preparation chamber has, at least partly, an open structure, for example by being defined by a grid or mesh structure.

Figure 2:
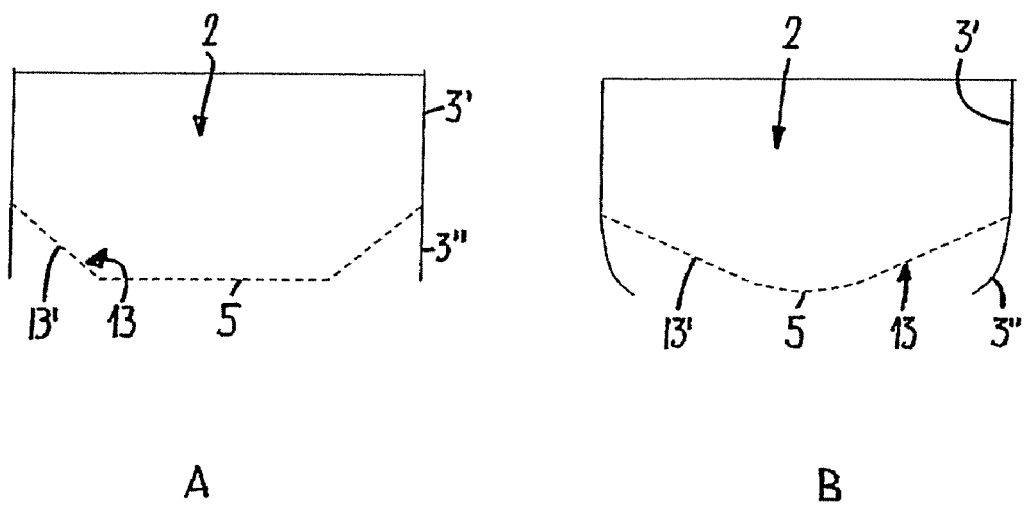
FIG. 2 schematically shows two different configurations of a bottom.

Whereas in FIG. 1 the bottom section 5 connects to the lowermost part of the inner wall 3, FIG. 2 shows two alternative embodiments in which the food preparation chamber 2 has a circumferential wall 3' with a lower end 3" extending downwardly beyond the connection between said circumferential wall 3' and the bottom section 5 of the food preparation chamber. In FIG. 2A said lower end 3" is straight and in FIG. 2B it is curved inwardly. Such lower end 3" prevents a disturbance of the upward airflow by the downward airflow out of channel 9 (see FIG. 1).

Again referring to FIG. 1 one can see that the food preparation chamber 2 comprises an upper portion 2' and a removable lower portion 2". The lower part 2" of the food preparation chamber comprises a grip 12. The bottom section may be part of a basket-like member 13 (indicated in FIG. 2) within the double wall. Basically such a basket-like member will comprise (vertically or inclined) upwardly extending walls (e.g 13' in FIG. 2) and a horizontally extending bottom wall which in the present embodiment is defined by the bottom section 5.

The lower portion 2" of the food preparation chamber can be removed from the shell 1. A user then can inspect the food in the basket-like member 13 and can, if needed, shake the basket-like member for disturbing the food therein or may choose different settings for the operation of the apparatus by means of a control panel (to be discussed below).

Not shown are means (for example valve members) which may be provided to automatically shut down the heat radiating elements and/or automatically close the channel 9 when the lower part 2" is removed. This prevents an unwanted outflow of heated air out of the apparatus in such a situation. Neither shown are pressure relief valves or filtration openings which may be provided to cope with an increasing pressure within the food preparation chamber due to the heating of the food.

As illustrated, for example in FIG. 2 or FIG. 4, the upwardly extending walls 13' of the basket-like member 13 diverge in such a way that the basket-like member 13 has an inverted frusto-conical shape. As a result a disposition of the food therein having a cross-sectional area increasing upwardly is provided which can be helpful in obtaining the regular flow pattern and even processing or preparing of the food sought for.

Finally on top of the shell 1 a control panel 14 is shown with which the operation of the apparatus can be controlled (e.g. by setting parameters such as temperature, heating time, flow velocity etcetera).

FIG. 3 shows two embodiments of an air guide member 11 comprising air guide ribs 15. Both in FIG. 3A and FIG. 3B these air guide ribs 15 are four in number and are arranged in vertical planes, extend radially and meet at a central location. The guide ribs substantially are arranged in the shape of a Greek cross. Such ribs 15 promote the upward air flow, prevent a circular (swirling) air flow and create a pressure increase towards the central location.

In FIG. 3B underneath or combined with said air guide ribs and concentrically therewith a frusto-conical upwardly tapering air guide part 11 is arranged. The upwardly tapering circumferential surface 16 of this air guide part 11 helps in directing air arriving from the channel 9 (see FIG. 1) upwardly into the food preparation chamber 2.

Figure 8:
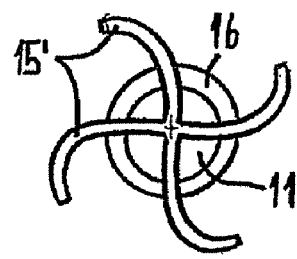
FIG. 8 shows an alternative configuration of air guide ribs.

FIG. 8 shows a top plan view of an alternative embodiment of the air guide ribs 15' with a curved extension, of which preferably the direction of curve is determined by the rotation direction of the fan such that the air converges in the center.

The air guide ribs 15 or 15' and, if provided, the air guide part 11 may define an assembly which is removable from the remainder of the apparatus.

FIG. 4 illustrates, in a view similar to FIG. 1, an alternative embodiment of the apparatus. Only the differences with respect to the embodiment according to FIG. 1 will be discussed.

In channel 9 for returning the air from the discharge opening 6 towards the bottom wall 5 vertically extending air guides 17 are provided. These air guides 17 are useful in preventing a circumferential, swirling air flow in said channel 9.

Figure 6:
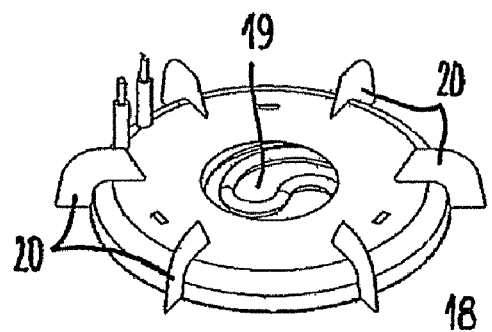
FIG. 6 perspectively shows an embodiment of a heat reflector.

In the upper part of the food preparation chamber 2 a heat reflector 18 is provided, which is shown in more detail in FIG. 6. This heat reflector 18 comprises a central opening 19 defining the discharge opening 6. Further this heat reflector 18 defines radially extending air guides 20 which then are positioned at the start of the channel 9 for returning the air from the discharge opening 6 towards the bottom wall 5. These air guides 20 also prevent a circumferential flow of the air in the channel 9, in addition to the air guides 17. Said heat reflector 18 may be removable.

Finally, in FIG. 4, there are shown mechanism 21 which is provided for preloading the lower portion 2" towards the upper portion 2' of the food preparation chamber. Such means may comprise a spring 22 located underneath the lower part of the food preparation chamber 2.

It may be advantageous if a mechanism is provided for initiating the deactivating of the heat radiating element 10 and/or stopping the air flow (disabling the fan 14) between the inner and outer walls when the upper 2' and lower portion 2" of the food preparation chamber 2 are separated. As a result no dangerous situations can occur when a user for example removes the lower part 2" without deactivating the apparatus.

For example such a mechanism may comprise a switch 34 cooperating with the removable portion 2" of the food preparation chamber. When the lower portion 2" is removed the switch 34 is operated providing an input to the controller to reactive power to the heat radiating element 10 and/or fan 14. However, other positions of such a switch 34 are conceivable too.

Figure 5:
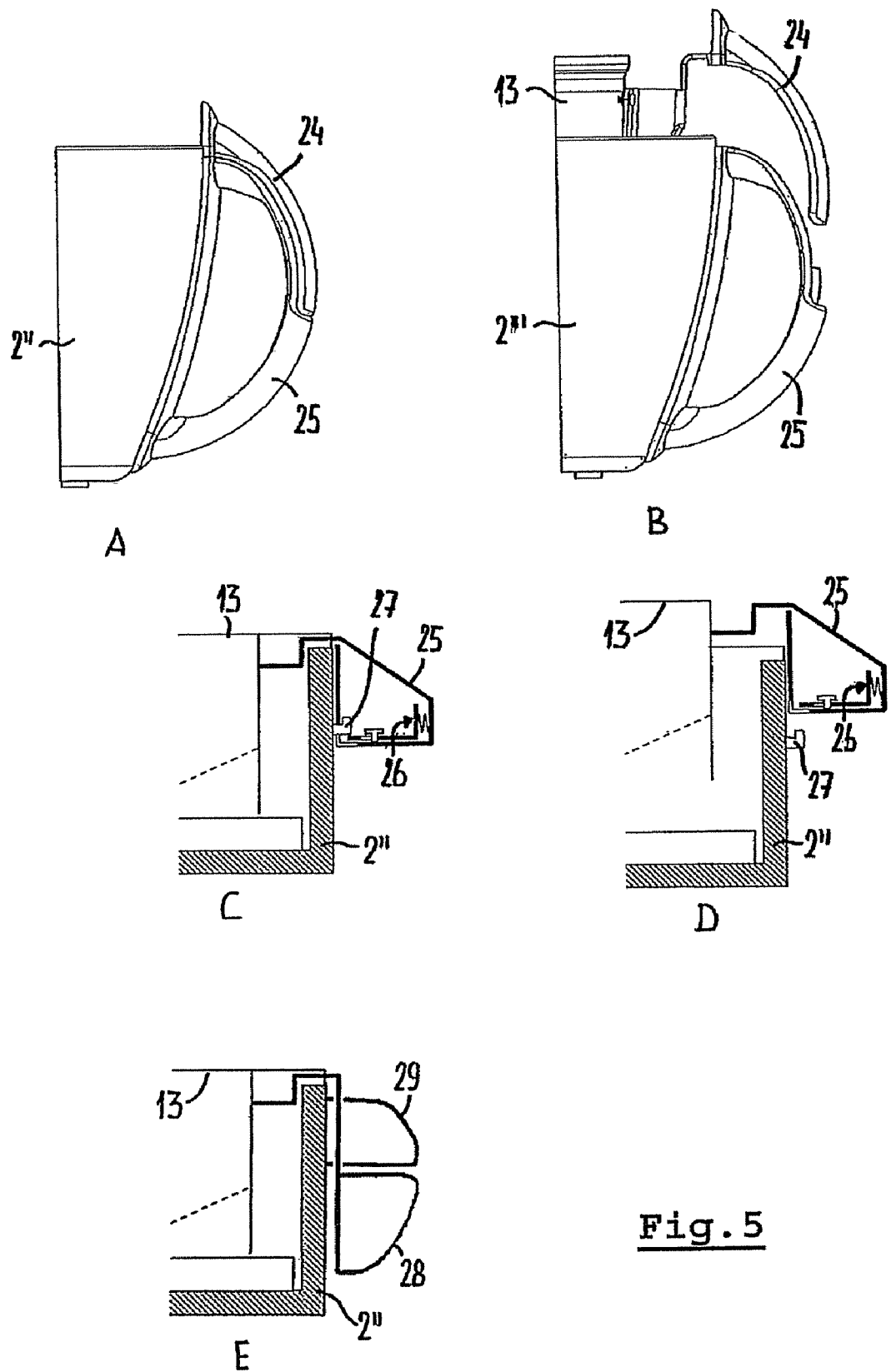
FIG. 5 shows three different grip configurations.

FIG. 5 shows alternative grip embodiments. FIGS. 5A and 5B show a lower portion 2" with first grip part 23 and a basket 13 with second grip part 24. In the assembled position (FIG. 5A) the grip parts 23 and 24 are nested to define a unitary combined grip.

FIGS. 5C and 5D show a basket 13 with grip 25 which is provided with a manually operable locking mechanism 26, and a lower portion 2" with locking part 27 cooperating with the locking mechanism 26 of the grip 25 when the basket 13 is positioned within the lower portion 2".

FIG. 5E illustrates a basket 13 with grip part 28 and lower portion 2" with grip part 29. In the illustrated assembled position the grip parts 28 and 29 are positioned in a common vertical plane one above the other. For removing the basket 13 from the lower portion 2" the basket first should be rotated in such a manner that both grip parts 28 and 29 are no longer positioned in a common plane.

Of course other grip embodiments are conceivable, such as for example grip parts of the basket and lower portion which in the assembled position are located closely alongside each other.

Figure 7:
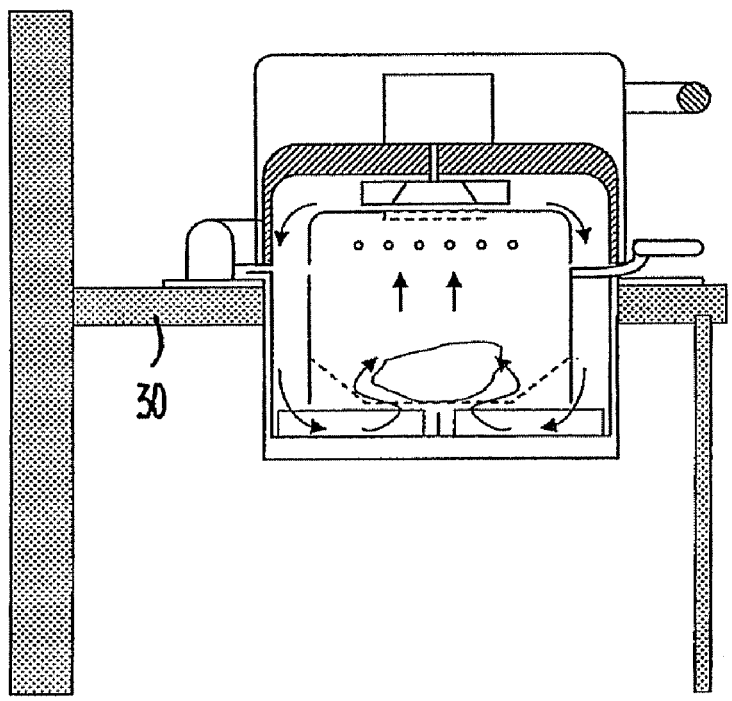
FIG. 7 shows, in a schematical vertical cross-sectional view, an embodiment of the apparatus according to the invention destined to be built-in in a surface.

Finally FIG. 7 illustrates an embodiment of the apparatus which can be built-in in a surface 30, for example a table top.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. An apparatus for preparing food, comprising a food preparation chamber with an outer wall, an inner wall with an air-permeable bottom wall and an end provided with an air discharge opening, a fan for moving hot air successively through the bottom wall, the food preparation chamber and the discharge opening, an air guide arranged for returning the air from the discharge opening towards the bottom wall separately from the food preparation chamber, a heat radiating element positioned in the food preparation chamber and an air guide member below the food preparation chamber, wherein the air guide member is disposed on the outer wall below the bottom wall, said air guide member arranged to direct the air flow essentially upwards over one or more surfaces of food present in the food preparation chamber, and wherein said air guide member comprises air guide ribs.

2. The apparatus according to claim 1, wherein the air guide member provides, when food is not present in the food preparation chamber, an air flow pattern having the highest velocity in the center of the food preparation chamber and decreasing radially outward.

3. The apparatus according to claim 1, wherein the air guide member comprises a frusto-conical upwardly tapering air guide part.

4. The apparatus according to claim 1, wherein the bottom wall of the food preparation chamber has, at least partly, an air permeable structure.

5. The apparatus according to claim 4, wherein the bottom wall of the food preparation chamber is, at least partly, defined by a grid or mesh structure.

6. The apparatus according to claim 1, wherein the food preparation chamber is constructed in a manner as to provide a disposition of the food therein having a horizontal cross-sectional area increasing upwardly.

7. The apparatus according to claim 1, wherein at least the bottom wall of the food preparation chamber is corrugated.

8. The apparatus according to claim 1, wherein the food preparation chamber has a circumferential wall, wherein the bottom wall of the food preparation chamber is connected to said circumferential wall through a connection and wherein the circumferential wall is provided with a lower end extending downwardly beyond the connection between said circumferential wall and the bottom wall of the food preparation chamber.

9. The apparatus according to claim 8, wherein said lower end of the circumferential wall is curved.

10. The apparatus according to claim 1, wherein the food preparation chamber is provided with a removable bottom wall.

11. The apparatus according to claim 1, wherein the food preparation chamber is double-walled with an inner wall and an outer wall defining therebetween the air guide for returning the air from the discharge opening towards the bottom wall and wherein said double-walled food preparation chamber is housed within an outer shell.

12. The apparatus according to claim 1, wherein the air guide for returning the air from the discharge opening towards the bottom wall comprises a number of distinct channels.

13. The apparatus according to claim 1, wherein the food preparation chamber comprises an upper portion having the end and a removable lower portion.

14. The apparatus according to claim 13 wherein the food preparation chamber is double-walled with an inner wall and an outer wall defining therebetween the air guide for returning the air from the discharge opening towards the bottom wall and wherein said double-walled food preparation chamber is housed within an outer shell, and wherein the lower portion of the food preparation chamber comprises a grip and a basket-like member within the double wall.

15. The apparatus according to claim 14, wherein the basket-like member has an inverted frusto-conical shape.

16. The apparatus according to claim 13 and further comprising a mechanism arranged for deactivating the heating radiating element and/or stopping the air flow between the inner and outer walls when the upper and lower portion of the food preparation chamber are separated.

17. The apparatus according to claim 16, wherein said mechanism comprises a switch cooperating with the removable portion of the food preparation chamber.

18. The apparatus according to claim 13, wherein both the upper portion and lower portion are provided with a grip.

19. The apparatus according to claim 18, wherein when the lower and upper portion are assembled, the grips together define a unitary combined grip.

20. The apparatus according to claim 1, wherein in the air guide arranged for returning the air from the discharge opening towards the bottom wall vertically extending air guides are provided.

21. The apparatus according to claim 1, wherein the air guide arranged for returning the air from the discharge opening towards the bottom wall, above the food preparation chamber, includes radially extending air guides.

22. The apparatus according to claim 21, wherein said radially extending air guides are part of a heat reflector defining the top of the food preparation chamber.

23. The apparatus according to claim 22, wherein said heat reflector is removable.

24. The apparatus according to claim 3, wherein the air guide part is removable from the remainder of the apparatus.

25. An apparatus for preparing food, comprising a food preparation chamber with an outer wall, an inner wall with an air-permeable bottom wall and an end provided with an air discharge opening, a fan for moving hot air successively through the bottom wall, the food preparation chamber and the discharge opening, an air guide arranged for returning the air from the discharge opening towards the bottom wall separately from the food preparation chamber, a heat radiating element positioned in the food preparation chamber and an air guide member below the food preparation chamber, wherein the air guide member is disposed on the outer wall below the bottom wall, said air guide member arranged to direct the air flow essentially upwards over one or more surfaces of food present in the food preparation chamber, wherein the food preparation chamber comprises an upper portion having the end and a removable lower portion, wherein the food preparation chamber is double-walled with an inner wall and an outer wall defining therebetween the air guide for returning the air from the discharge opening towards the bottom wall and wherein said double-walled food preparation chamber is housed within an outer shell. and wherein the lower portion of the food preparation chamber comprises a grip and a basket-like member within the double wall, and wherein the basket-like member is removable and wherein the grip comprises an activatable latch arranged for connecting and disconnecting the removable basket-like member.

26. An apparatus for preparing food, comprising a food preparation chamber with an outer wall, an inner wall with an air-permeable bottom wall and an end provided with an air discharge opening, a fan for moving hot air successively through the bottom wall the food preparation chamber and the discharge opening, an air guide arranged for returning the air from the discharge opening towards the bottom wall separately from the food preparation chamber, a heat radiating element positioned in the food preparation chamber and an air guide member below the food preparation chamber wherein the air guide member is disposed on the outer wall below the bottom wall, said air guide member arranged to direct the air flow essentially upwards over one or more surfaces of food present in the food preparation chamber, wherein the food preparation chamber comprises an upper portion having the end and a removable lower portion, and further comprising a mechanism arranged for preloading the lower portion towards the upper portion of the food preparation chamber.

27. The apparatus according to claim 26, wherein said air guide member comprises air guide ribs.

28. The apparatus according to claim 27, wherein said air guide ribs are arranged in vertical planes, extend radially and meet at a central location.

29. The apparatus according to claim 28, wherein there are three or more air guide ribs substantially arranged as a cross with arms of equal length.

30. The apparatus according to claim 28, wherein the individual air guide ribs have a curved shape.

31. The apparatus according to claim 28, wherein the air guide ribs are on an assembly that is removable from the remainder of the apparatus.

32. The apparatus according to claim 26, wherein said mechanism comprises a spring located underneath the lower portion.

33. An apparatus for preparing food, comprising a food preparation chamber with an outer wall, an inner wall with an air-permeable bottom wall and an end provided with an air discharge opening, a fan for moving, hot air successively through the bottom wall the food preparation chamber and the discharge opening, an air guide arranged for returning the air from the discharge opening towards the bottom wall separately from the food preparation chamber, a heat radiating element positioned in the food preparation chamber and an air guide member below the food preparation chamber wherein the air guide member is disposed on the outer wall below the bottom wall, said air guide member arranged to direct the air flow essentially upwards over one or more surfaces of food present in the food preparation chamber, and wherein the food preparation chamber comprises a pressure relief valve.

34. An apparatus for preparing food, comprising a food preparation chamber with an air-permeable bottom wall and an end provided with an air discharge opening, a fan for moving hot air successively through the bottom wall, the food preparation chamber and the discharge opening, an air guide arranged for returning the air from the discharge opening towards the bottom wall separately from the food preparation chamber, a heat radiating element positioned in the food preparation chamber and an air guide member below the food preparation chamber, wherein the air guide member is provided for directing the air flow essentially upwards over one or more surfaces of food present in the food preparation chamber, wherein said air guide member comprises air guide ribs, and wherein said air guide ribs are arranged in vertical planes, extend radially and meet at a central location.

* * * * *